March 1, 1932.   C. E. URFER   1,847,503
RIDDLE
Filed July 23, 1929
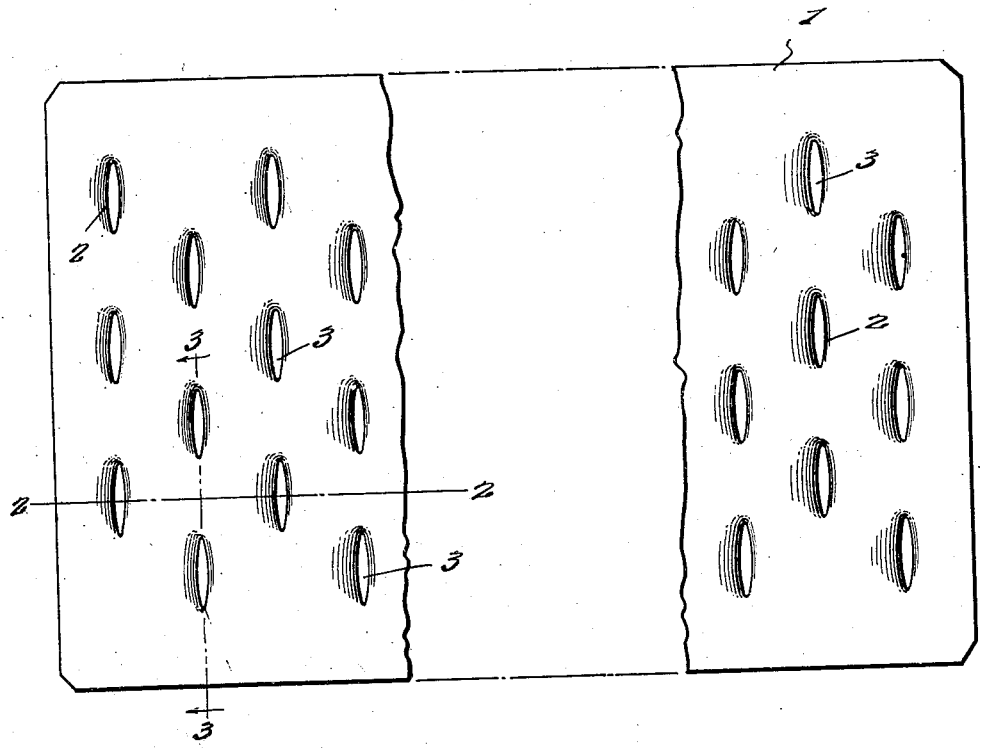
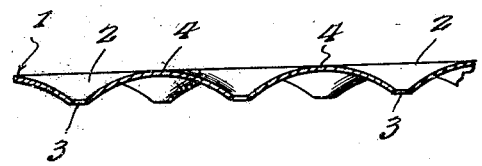
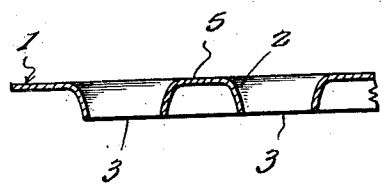
Inventor
C. E. Urfer.
By Lacey & Lacey, Attorneys Patented Mar. 1, 1932

1,847,503

UNITED STATES PATENT OFFICE

CLARENCE E. URFER, OF TOWER HILL, ILLINOIS

RIDDLE

Application filed July 23, 1929. Serial No. 380,395.

The present invention is directed to improvements in riddles.

The primary object of the invention is to provide a device of this character so constructed that it will effectively separate timothy or clover seed from pepper grass seed or the like.

Another object of the invention is to provide a riddle so constructed as to prevent clogging or choking during the operation thereof.

Another object of the invention is to provide a device of this kind which is exceedingly simple in construction, efficient in operation, durable, and one which can be manufactured at small cost.

With these and other objects in view, this invention resides in the novel features of construction, formation, combination and arrangement of parts to be hereinafter more fully described, claimed and illustrated in the accompanying drawings, in which:

Figure 1 is a plan view of the riddle.

Figure 2 is a sectional view on the line 2—2 of Figure 1.

Figure 3 is a sectional view on the line 3—3 of Figure 1.

Referring to the drawings, the numeral 1 designates the body of the riddle, which is formed from suitable gauge sheet metal of any determinate size. The body is preferably rectangular in shape and may be mounted for agitation in any approved manner. The body is cut or pressed in any appropriate manner to provide a plurality of transversely alined elongated indentations 2 arranged in rows, the indentations of each row being arranged in staggered relation so that the material moving longitudinally of the body will be compelled to encounter the indentations. These indentations have their bases or lower ends provided with transversely disposed slots 3. It will be observed, upon reference to Figure 2 of the drawings, that the material of the body between alternate indentations of each row is concavo convex in cross section, the convex portion 4 being disposed upwardly in order that a rounded surface will be provided between the alternate slots to permit a flat or somewhat elongated seed and extraneous matter such as powdered leaves and the like, to pass through the slots while the round and relatively plump seeds will pass over the indentations and slots to be discharged at one end of the riddle.

Upon reference to Figure 3, it will be observed that the surface of the body between the alined indentations is relatively flat, as indicated at 5.

While the riddle is primarily designed for separating timothy or clover seed from pepper grass seed, it is not necessarily limited to such use since it can be made in various sizes for separating various materials and it has been found to be well adapted for separating cracked soy beans from the whole beans.

From the foregoing, it is thought that the operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What is claimed is:

1. A riddle of sheet material having rows of elongated openings formed therein and extending in the same general direction, the openings tapering from a middle point toward opposite ends, and being adapted to discharge elongated foreign matter such as pepper grass while seeds such as clover and timothy pass over the portions of the material between the sides of the adjacent openings of a row being concavo-convex, and being adapted to guide flat seed and foreign matter such as pepper grass toward the openings while the plump round seeds pass over, and the portions of the material between the ends of adjacent openings in the same row being straight and being adapted to promote the quick passage of seeds thereover.

2. A riddle of sheet material provided with transverse and longitudinal rows of openings having a staggered arrangement, the openings being elongated and disposed with their major axes transversely and tapering from a middle point toward opposite ends, said openings being adapted to discharge elongated foreign matter such as pepper grass while seeds such as clover and timothy pass over, the material between adjacent openings of the longitudinal rows being concavo-convex, and being adapted to guide flat seed or foreign matter such as pepper grass toward the openings while the plump round seeds pass thereover, and the material between adjacent openings of the transverse rows being straight and being adapted to promote the quick passage of seeds thereover.

In testimony whereof I affix my signature.

CLARENCE E. URFER. [L. S.]